United States Patent [19]
Amano et al.

[11] Patent Number: 4,620,229
[45] Date of Patent: Oct. 28, 1986

[54] PICTURE DISPLAY DEVICE

[75] Inventors: Toshio Amano, Kanagawa; Yoshihisa Fujioka, Saitama; Kunio Nagai, Kanagawa; Osamu Oda, Tokyo, all of Japan

[73] Assignee: Sony Corporation, Tokyo, Japan

[21] Appl. No.: 726,680

[22] Filed: Apr. 24, 1985

[30] Foreign Application Priority Data

Apr. 28, 1984 [JP] Japan .................................. 59-87637

[51] Int. Cl.$^4$ .............................................. H04N 5/44
[52] U.S. Cl. .................................. 358/194.1; 358/183; 358/192.1; 358/114; 358/181; 358/117
[58] Field of Search ...................... 358/22, 183, 194.1, 358/192.1, 114, 117, 123, 181

[56] References Cited

U.S. PATENT DOCUMENTS

| 4,325,078 | 4/1982 | Seaton et al. | 358/117 |
| 4,386,436 | 5/1983 | Kocher et al. | 358/194.1 |
| 4,398,193 | 8/1983 | Kuniyoshi et al. | 358/194.1 |
| 4,488,179 | 12/1984 | Krüger et al. | 358/194.1 |

FOREIGN PATENT DOCUMENTS 2905625  8/1980  Fed. Rep. of Germany ...... 358/114

OTHER PUBLICATIONS

Kerkhof; Microcomputer-Controlled Tuning and Control System for TV; 8-79; vol. No. 4, pp. 199-214; Elec. Comp. & Applications.
Kokado et al; 2-76; A Programmable TV Receiver; vol. CE-22, No. 1, pp. 69-83; IEE Trans. on Consumer Electronics.

Primary Examiner—James J. Groody
Assistant Examiner—C. Smith
Attorney, Agent, or Firm—Lewis H. Eslinger; Alvin Sinderbrand

[57] ABSTRACT

A picture display apparatus has respective modes in which it displays at least three different types of pictures in sequence in response to actuations of a single switch. The picture display apparatus may be incorporated within a conventional television receiver having a programmable timer, and in such case the first type of picture is the normal television picture, the second type of picture is a display of the current day of the week and current time, and the third type of picture is a display of programming information stored in the programmable timer. When the switch is actuated within a predetermined time from the occurrence of a characteristic event in the respective mode, the next type of picture in the sequence is displayed. When the switch is actuated after the predetermined time has elapsed, the first type of picture in the sequence is displayed.

12 Claims, 14 Drawing Figures

PICTURE DISPLAY DEVICE

BACKGROUND OF THE INVENTION

1. Field of the Invention

This invention relates generally to picture display devices and, in particular, is directed to a picture display device which can display different types of pictures on a display apparatus, such as a television receiver.

2. Description of the Prior Art

The standard television receiver is used to display the television picture received from different television broadcasting stations. It can also be used as a monitor to display an image picked up by a camera if the corresponding information signal is supplied to the receiver's display circuits. While it is desirable that the normal television picture be the fundamental picture, that is, presented first whenever the television receiver is turned on, the use of the television receiver could be greatly expanded to make available many other forms of information, each involving a different type of picture display, by supplying other appropriate information signals are supplied to the display circuits.

For example, many television broadcasting stations transmit a current time signal at certain times of the day to create a corresponding display on the picture screen. This display might appear as "9:00 A.M.". While this is only done at certain times, it may be convenient to the operator of the television receiver to have a current time display whenever he wishes. Advantageously, this current time display could be superimposed on the normal television picture, so that it would not interrupt television viewing, but rather would enhance it.

Another possibility for a new picture display stems from the wish to pre-program television program selections so that the operator will not forget to watch a program he wishes to see. For this purpose, a channel reserve timer, such as those conventionally used in video tape recorders, may be provided in the television receiver which can store the reserved channels and times and thereby control the operation of the television receiver during the reserved times. Usually, however, the information is inputted by actuating keys on the television receiver, and there may be no provision, after the fact, for easily confirming the reserved times and channels. Consequently, it would be advantageous to provide a display of the reserved times and channels on the picture screen of the television receiver. Not only would this serve as a convenient reminder for the operator, but it would also present the information to be checked for accuracy.

A third type of picture display could be used in conjunction with a channel block. A channel block will prevent the display of the television picture for a particular channel at a particular time so that children may not watch undesirable programs or programs late at night without supervision. The times and channels of any such undesirable programs may be learned in advance from T.V. listings. It would be a very desirable feature for the adult operator to block a particular television channel for a predetermined period of time by presenting a different type of picture on the picture screen rather than the normal television picture.

When such a plurality of different types of pictures are available for display on the picture screen of the television receiver, it would be very convenient for the operator to be able to step through the different types of pictures sequentially by repeated operation of the same key, either on the television receiver itself or advantageously on a remote control commander.

However, a picture display device which can display these different types of pictures, such as the current time display, the channel reserve display, and the channel block display, superimposed upon or in place of a normal television picture, is not presently available.

OBJECTS AND SUMMARY OF THE INVENTION

Accordingly, it is an object of the present invention to provide a picture display device for displaying a plurality of different types of pictures on a display apparatus, such as a television receiver.

It is another object of the present invention to provide a picture display device which can be easily controlled to select a desired one of the plurality of types of pictures for display.

It is still another object of the present invention to provide a picture display device which displays the normal television picture as the first, or fundamental, type of picture when the receiver is turned on.

It is yet another object of the present invention to provide a picture display device for displaying one of a plurality of different types of pictures on a display apparatus, and in which the different types of pictures are displayed sequentially in response to repeated actuation of a single control key.

According to one aspect of the present invention, there is provided a picture display apparatus for displaying at least first, second and third types or pictures in that order in a cyclical sequence the picture display apparatus comprising display means having first, second and third modes of operation for displaying the first, second and third types of pictures, respectively, actuable switch means, control means operably connected to said display means and responsive to actuation of the switch means for establishing one of said modes of operation and thereby selecting the respective one of said types of pictures for display, each mode having a characteristic event occurring therein, and timing means for determining an elapsed time from the characteristic event occurring in the respective mode to a next actuation of the switch means, the control means being responsive to an actuation of the switch means in each mode to select the next mode in sequence when the elapsed time is less than a predetermined time, and to select the first mode when the elapsed time is at least as great as said predetermined time.

In the preferred embodiment of the invention, the first type of picture is a normal television picture, the second type of picture is a display of the current day of the week and time, and the third type of picture is a display of channel reserve information. In accordance with a further feature, a fourth type of picture is available and is a display of channel block information. These first through fourth types of pictures are defined as main pictures, and in addition auxiliary pictures may be presented in each mode or in additional modes to explain the operation of the picture display device according to the present invention or to assist the input of information, such as channel reserve or channel block information. When the operator merely wishes to view the different types of main pictures, he may do so by successive actuations of the switch means occuring within a limited time, for example, within three seconds of each other. Alternatively, the operator may recover the normal television picture at any point by allowing at least three seconds to elapse between actuations of the switch means.

The above, and other objects, features and advantages of the present invention, will become apparent from the following detailed description of a preferred embodiment taken in conjunction with the accompanying drawings, throughout which like reference numerals designate like elements and parts.

DESCRIPTION OF THE PREFERRED EMBODIMENT

Figure 1:
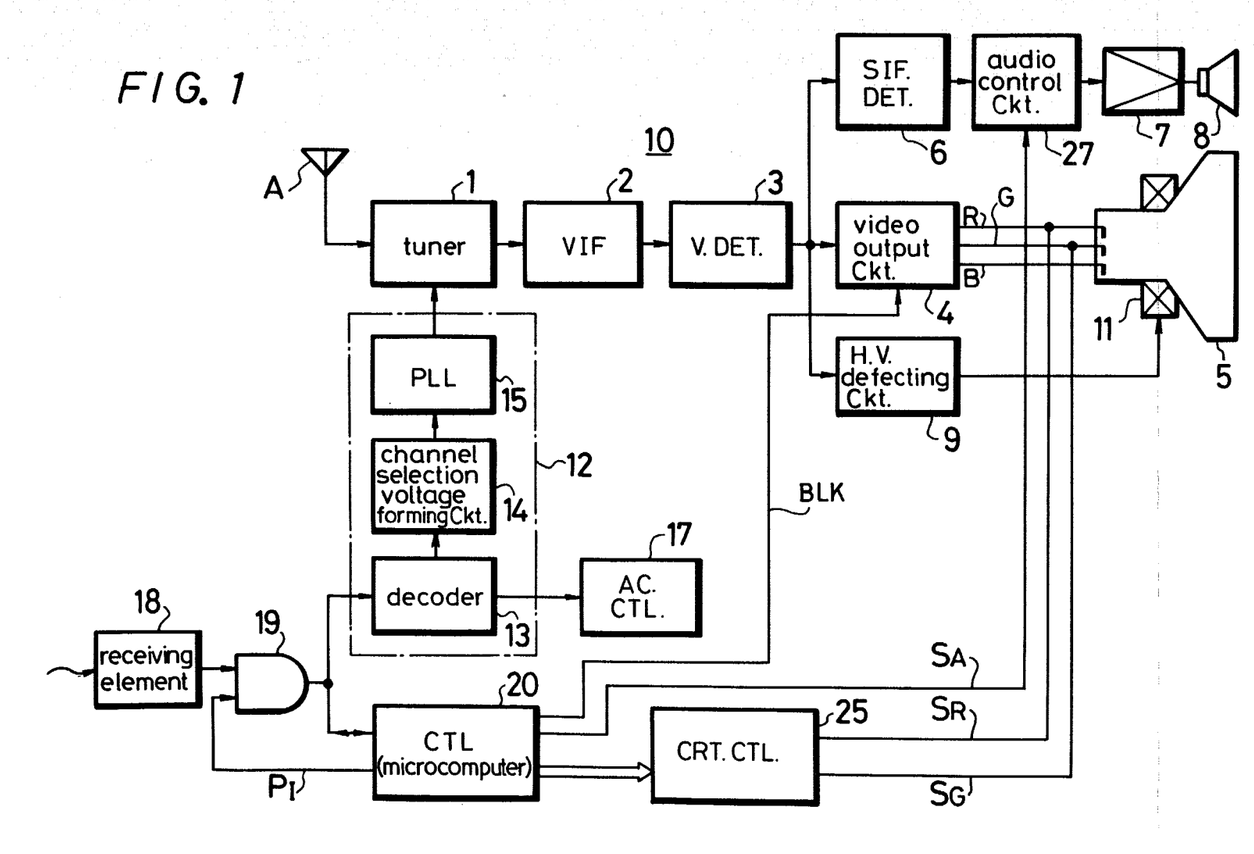
FIG. 1 is a block diagram of a preferred embodiment of a picture display device according to the present invention.

Referring to the drawings, and initially to FIG. 1 thereof, there is illustrated a preferred embodiment of a picture display device according to the present invention which is shown, only by way of example, as incorporated in a standard television receiver. Of course, it will be understood that different types of display apparatus may be used in a picture display device according to the present invention, and which employ a CRT or LED display screen, and the like.

When the picture display device according to the present invention is incorporated in a standard television receiver, it is advantageous to use the normal television picture as the fundamental or first type of picture presented whenever the television receiver is turned on. The number of additional or other types of pictures and the contents thereof may be as many and as varied as desired. In the illustrated embodiment, by way of example, the second type of picture is defined as one displaying the current day of the week and the current time, the third type of picture is defined as one displaying the channel reserve, and a fourth type of picture is defined as one displaying channel block information.

These are the main pictures provided in the preferred embodiment. However, a number of auxiliary or sub-pictures may be presented to explain or assist the input of data to the picture display device or to clarify the procedure of moving from one main picture type to another.

As illustrated in FIG. 1, the picture display device 10 incorporated in a conventional television receiver includes a tuner 1 receiving the broadcast television signals through an antenna A, and supplying a selected channel signal through a video intermediate frequency amplifier 2 to video a detector 3. The output of video detector 3 is supplied first to a video output circuit 4 for supplying the three primary color signals R, G and B to a picture screen or CRT 5. The output of video detector 3 is also supplied to an audio intermediate frequency detecting and amplifying circuit 6 and then through an audio control circuit 27 and an output amplifier 7 to a loudspeaker 8 to produce the television sound. Thirdly, the output of video detector 3 is supplied to a horizontal and vertical deflecting circuit 9 which provides control signals to control the operation of a conventional deflecting system 11 for CRT 5.

An electronic tuning circuit 12 is provided and includes a decoder 13, a channel selection voltage forming circuit 14, and a phase locked loop 15. A receiving element 18 receives remote control signals, conventionally transmitted in the infrared frequencies, from a remote control commander 30 to be described below in connection with FIG. 2. Of course, such control signals could be provided directly if appropriate keys are provided on the television receiver itself. The received remote control signals are supplied through one input of an AND circuit 19 to decoder 13. The output of electronic tuning circuit 12, which is the output of phase locked loop 15, is supplied to tuner 1 to control the selection of the desired channel in a conventional manner.

The output of decoder 13 is also fed to an AC power source circuit 17, which is operative to turn the television receiver on or off in response to an ON/OFF power remote control or internal control signal.

A control circuit 20 including a conventional program timer, similar to those available in video tape recorders, is provided for controlling the display of the different types of pictures. Control circuit 20 is advantageously embodied in a microcomputer on an integrated circuit and supplies a plurality of internal control signals to different elements of picture display device 10 for controlling the operations thereof. Control circuit 20 also includes a clock set by the operator for timing control. A detailed description of the operation of picture display device 10 under the control of control circuit 20 is given in connection with FIGS. 6A–6C and 7.

A CRT control circuit 25 including a conventional character generator receives a plurality of control signals from control circuit 20 to generate red and green character signals $S_R$, $S_G$ which are supplied to CRT 5. These character signals $S_R$, $S_G$ are used to generate the second through fourth types of pictures which consist primarily of words and numbers.

Control circuit 20 supplies a blanking signal BLK to video output circuit 4 for blanking the display on CRT 5, and supplies audio control signal $S_A$ to audio control circuit 27 to cause loudspeaker 8 to emit a beeping or buzzing sound at the time of key operation, if desired.

Control circuit 20 also supplies control signals to decoder 13 of electronic tuning circuit 12 to control the channel selection and AC power source circuit 17, as will be described below. Whenever control circuit 20 provides such control signals, it also provides a pulse $P_I$ to a second input of AND circuit 19 to inhibit the passage therethrough of any remote control signal picked up by receiving element 18. Thus, only one of the remote control signals and the control signals from control circuit 20 will be supplied to decoder 13 at any time.

Figure 2:
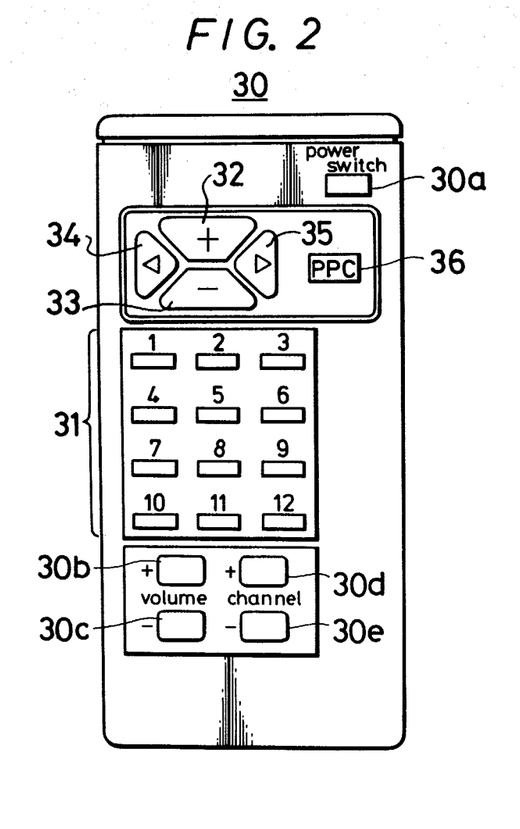
FIG. 2 is a plan view of a remote control commander of the picture display device according to the present invention, illustrating various keys provided thereon.

A remote control commander 30 for controlling the operation of picture display device 10 is illustrated in FIG. 2. As is conventional, commander 30 includes an ON/OFF power switch actuator 30a, volume control switch actuators 30b and 30c for respectively increasing and decreasing the sound level from the television receiver, and channel selection switch actuator's 30d and 30e for stepping through the allowed channels in the increasing and decreasing directions, respectively. In addition, a plurality of processing keys are provided for inputting time and channel information to picture display device 10. These processing keys include a ten-key panel 31, a "+" key 32, a "—" key 33, and left and right shift keys 34, 35 for shifting a cursor appearing on the picture screen in the left and right directions, respectively. In accordance with an important aspect of the present invention, commander 30 also includes a PPC (programmable pickup center) key 36, which operates as a changeover switch for changing the display from one type of picture to another.

Figure 3:
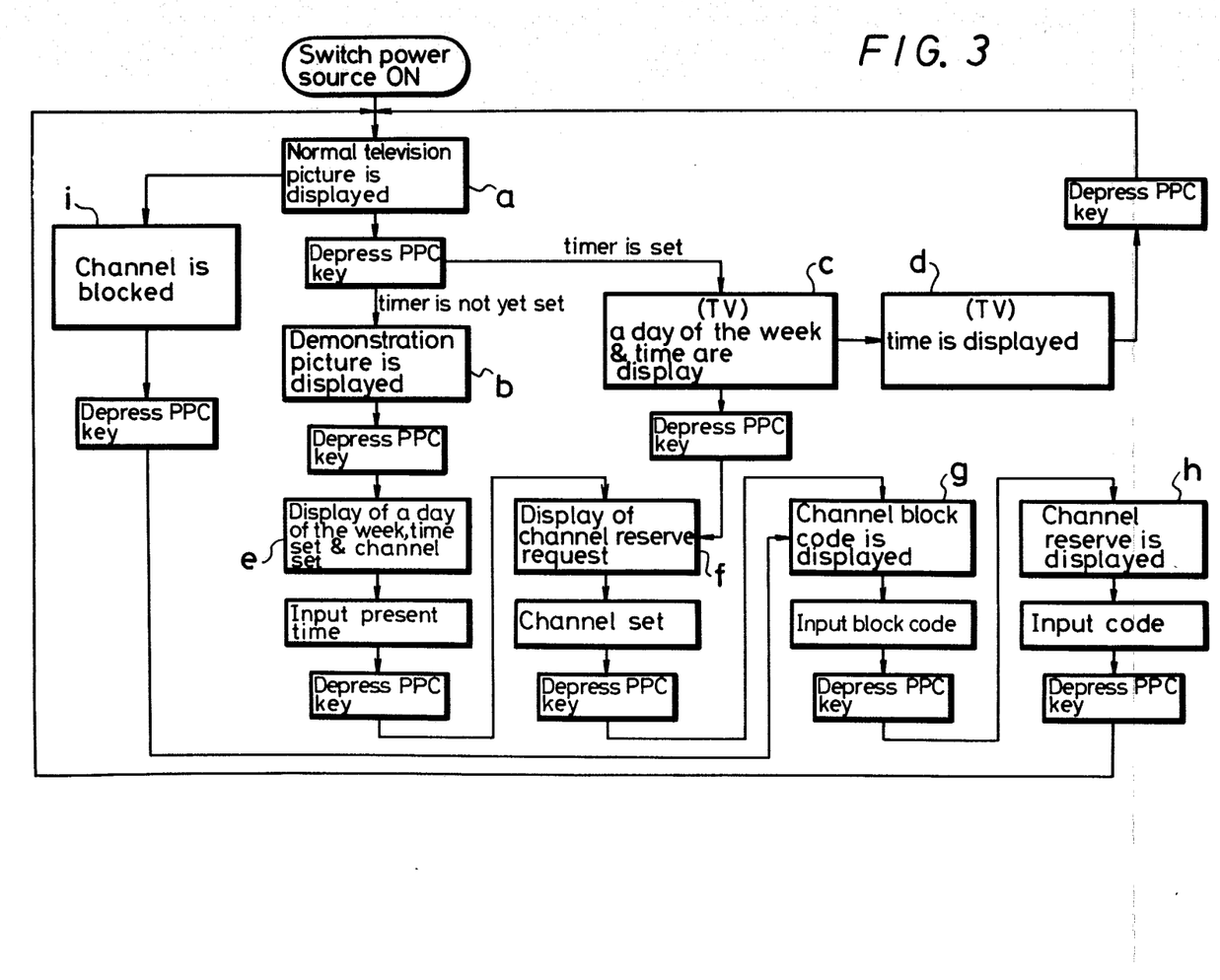
FIG. 3 is a flow chart illustrating the operation of the picture display device in displaying different types of pictures.

The operation of picture display device 10, including the setting of times and channels, is carried out under the control of control circuit 20 in response to remote control signals received from commander 30. A flow chart of this operation of picture display device 10 in response to actuations of PPC key 36 is illustrated in FIG. 3, and, as shown therein, picture display device 10 is stepped through different display modes each having a particular type of main picture associated therewith. A more detailed description of the complete operation of the picture display device 10 for time setting, channel reserving, channel blocking, etc., in addition to main picture selection, in response to actuation of all of the processing keys is provided below in connection with the flowcharts of FIGS. 6A–6C and 7.

As shown in FIG. 3, when the power to the television receiver is switched on, operation begins in step a which corresponds to a first mode of operation and the normal television picture is displayed on CRT 5. This normal television picture, used as the first or fundamental type of picture, is defined in control circuit 20 as page "0". The subsequent or other types of pictures are also assigned page numbers, which are used as indicators in the processing steps to determine which processing path to take.

If PPC key 36 is now depressed, the operation branches in dependence on whether or not the clock or timer within control circuit 20 has been set to the current time.

Figure 4A:
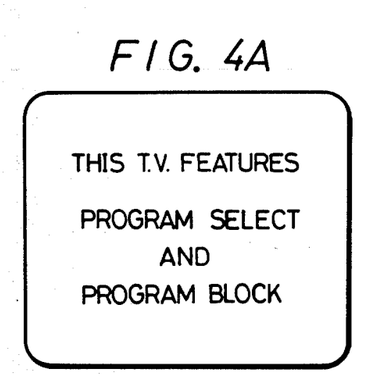
FIGS. 4A–4F are schematic views of a screen showing respective examples of different types of displayable pictures.
Figure 4B:
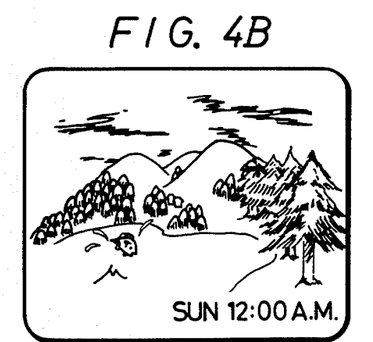

If the clock is already set, the operation proceeds to step c, wherein a current time display including both the current day of the week and the current hour and minute are superimposed over the normal television picture. An example of this display is illustrated in FIG. 4B, with the day of the week and time appearing at the lower right hand corner of the picture screen. The day of the week is displayed only for a predetermined time, which in the illustrated embodiment is three seconds, and then it disappears and in step d only the current hour and minute are displayed. The time displays of steps c and d together define the second type of main picture, and are identified in control circuit 20 as page "1".

If PPC key 36 is depressed when the operation is in step d, the time display is erased and page "0", the normal television picture, is recovered.

If the clock or timer is not yet set where PPC key 36 is depressed after step a, the operation moves instead to step b and, a first auxiliary picture appears in place of the television picture. This first auxiliary picture is also page "1" in control circuit 20, and an example is illustrated in FIG. 4A. It provides a listing of the additional features available on the television receiver by virtue of the program display device 10. This is particularly useful for operators who are unfamiliar with the system. Therefore, if PPC key 36 is depressed while the normal television picture is displayed, either the first auxiliary picture or the successive time displays of steps c and d appear. Control circuit 20 identifies the first auxiliary picture and the two time displays collectively as page "1".

Figure 4C:
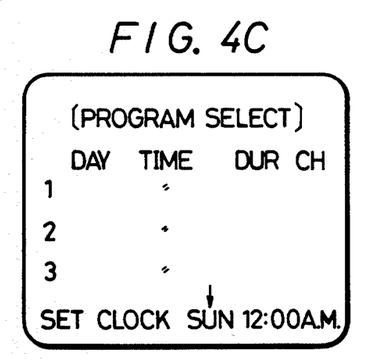

If the PPC key 36 is again depressed in step b, a third type of picture, illustrated in FIG. 4C, is presented in step e. This third type of picture is identified as page "2" in control circuit 20, and is used in both a time set mode for setting the clock and a channel reserve mode in which channel and time information are entered. In step e the present or current time information is entered, and this is done by appropriate actuation of ten-key panel 31 and processing keys 32–35. An arrow (cursor) points first to the day of the week to be entered, as illustrated, and then to the hour and minute. A detailed description of this operation is given below in connection with FIG. 7.

When the clock has been set, PPC key 36 is depressed and the routine enters step f, in which the same third type of picture is displayed but picture display device 10 is in a channel reserve mode.

As illustrated in FIG. 4C, this picture indicates three programs which may be reserved, and has indicated spaces for the day, start time, duration, and channel for each of the three different program choices. The arrow will point to the different elements which are to be set, and data is entered by actuation of appropriate keys of ten-key panel 31 and processing keys 33 and 35, as in the timer set mode.

Figure 4D:
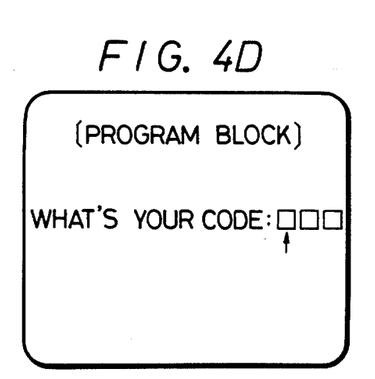

Once the program selections have been made, PPC key 36 is again depressed and picture display device 10 enters a channel block reserve mode in step g. A second auxiliary picture, illustrated in FIG. 4D, is displayed for inputting an identifying code. The identifying code enables the adult operator to enter or remove a channel block, while preventing the children, who do not know the identifying code, from removing a channel block. Again, as illustrated in FIG. 4D, an arrow points to the digit of the three digit identifying code to be entered. The second auxiliary picture is identified in control circuit 20 as page "3".

Figure 4E:
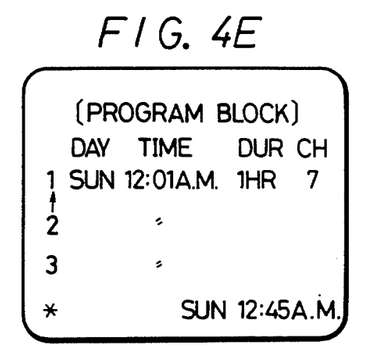
Figure 4F:
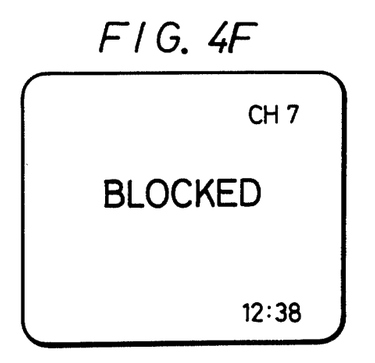

After the identifying code is entered and PPC key 36 is depressed again, a channel block reserve picture is displayed in step h, as illustrated in FIG. 4F. This channel block reserve picture is the fourth type of main picture and is identified in control circuit 20 as page "4". The information defining the channels and times to be blocked is entered as above and PPC key 36 is then depressed, at which point operation returns to step a to display the normal television picture.

If the television receiver is turned on at the times designated for channel block, the operation proceeds automatically through steps a to step i, and a picture of the type illustrated in FIG. 4F is displayed instead of the normal television picture. This picture displays the channel, the current time, and the word "blocked". To remove the channel block, PPC key 36 may be depressed to return the operation to step g, so that the second auxiliary picture, (FIG. 4D) is displayed. If the correct identifying code is entered, the channel block may be removed to recover the normal television picture.

A final option occurs when the timer is set while the operation is in step c, but the operator wishes to input channel reserve and/or channel block information. If PPC key 36 is depressed within three seconds after entering step c, the operation moves directly to step f instead of to step d.

Figure 5:
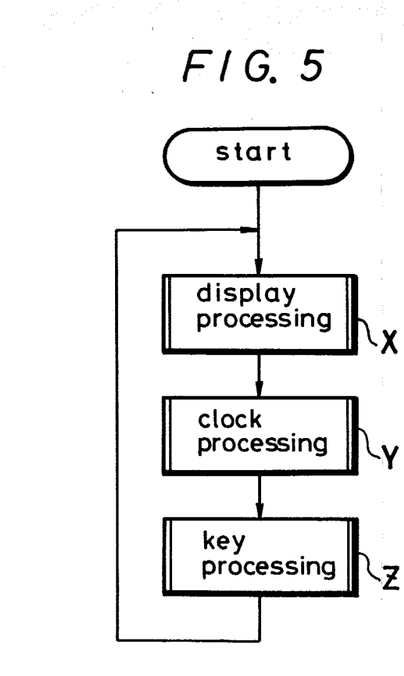
FIG. 5 is a schematic flow chart of the different types of information processing performed by the picture display device.

The procedure described above may be regarded as involving the three basic processing routines illustrated in FIG. 5, that is, a display routine X consisting of steps a, c and d which results in the display of time information, a clock start routine Y which starts the reserve clock of the reserve timer, and a key processing routine Z which consists of steps e, f, g and h and which sets, stores and displays the clock, channel reserve and channel block information.

A detailed description of the complete operation of picture display device 10 according to the present invention will now be given in connection with FIGS. 6A-6C and FIG. 7, which show respective portions of a single detailed flow chart. Processing routines X, Y and Z are indicated thereon. In order to provide a complete description, it will be assumed that the clock of the reserve timer has not been set and that no channel reserve or channel block information has yet been input. This situation might occur the first time picture display device 10 is used after being purchased, or if for some reason the entire system is initialized. Under these circumstances, control circuit 20 has stored within it page "0" for the normal television picture. A block flag FB, which is used in the channel block processing is in the reset or "0" state, and a color flag FW is set so that the television picture, when saturated, will be white, which is the normal condition.

When the television receiver is turned on by actuation of power switch 30a on commander 30, the processing within control circuit 20 starts at step 101, which checks for page "0". It should be noted that the routine illustrated in FIGS. 6A-6C loops back many times through step 101 in its various processing steps. Indeed, each mode involves many loops, rather than a single pass through, with each pass through taking a slightly different route in dependence on key, actuations and elapsed times. At this first pass through step 101, since the normal television picture is the fundamental or first type of picture and always appears first when the television receiver is turned on, the page is initialized to page "0" and the routine proceeds to step 102 to check block flag FB. Since it is initialized to the reset state at this point, the processing proceeds to step 103, wherein the normal television picture is displayed.

At this point the clock is not set. The routine moves to step 104 (bottom left-hand corner of FIG. 6A and top left hand corner of FIG. 6B), to check a clock flag to see if it is set, i.e. if the clock is set. However, the clock flag is reset, so the routine bypasses step 105, which would start the clock counting once it has been set, and moves through steps 106, 107, 108 and 109. Steps 106 to 109 are active only after channel reserve and channel block information has been entered and so will be ignored until such time. The routine thus moves from step 104 to step 110.

Figure 6A:
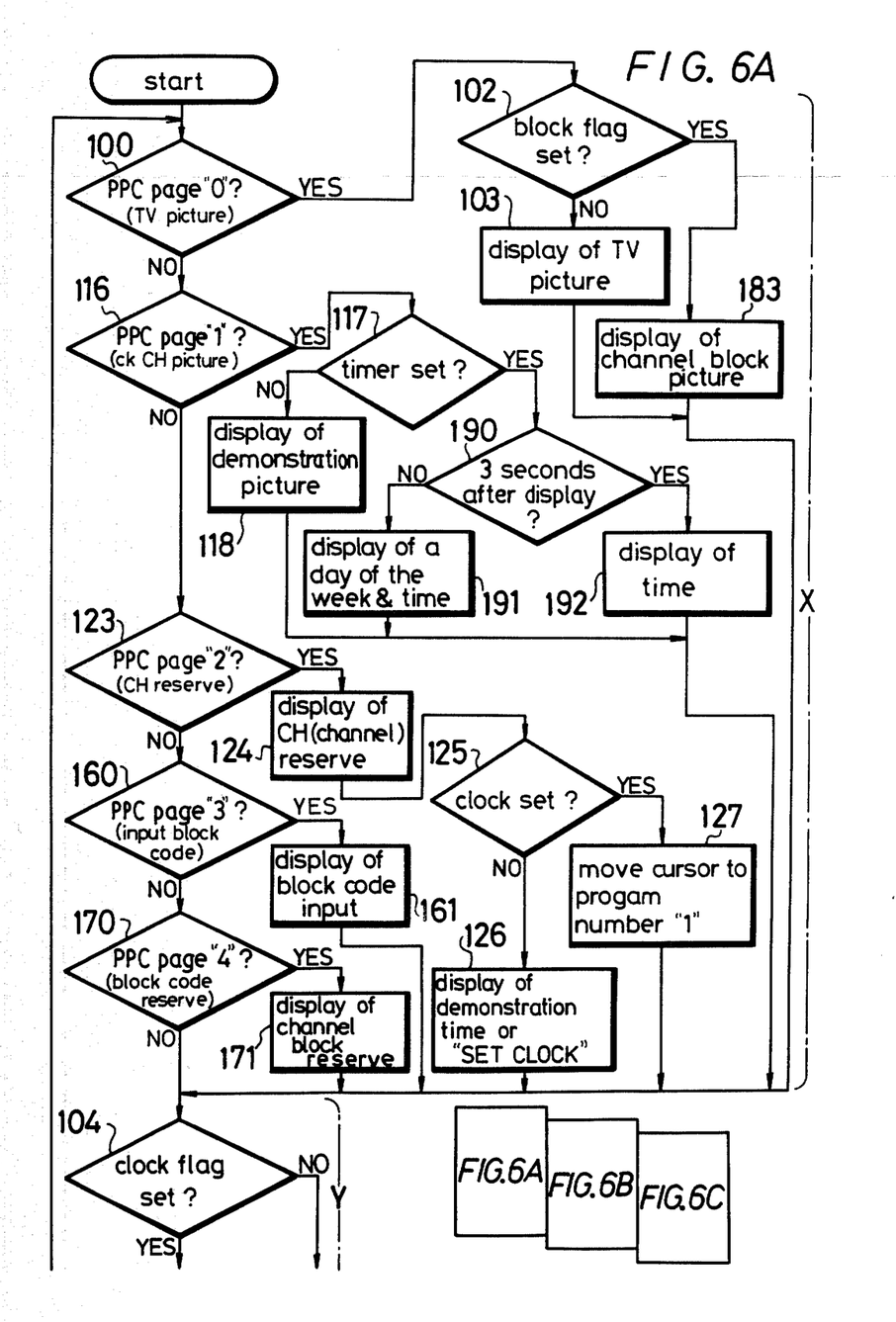
FIGS. 6A–6C are respectively different portions of a single detailed flow chart illustrating the operation of the picture display device according to the present invention.
Figure 6B:
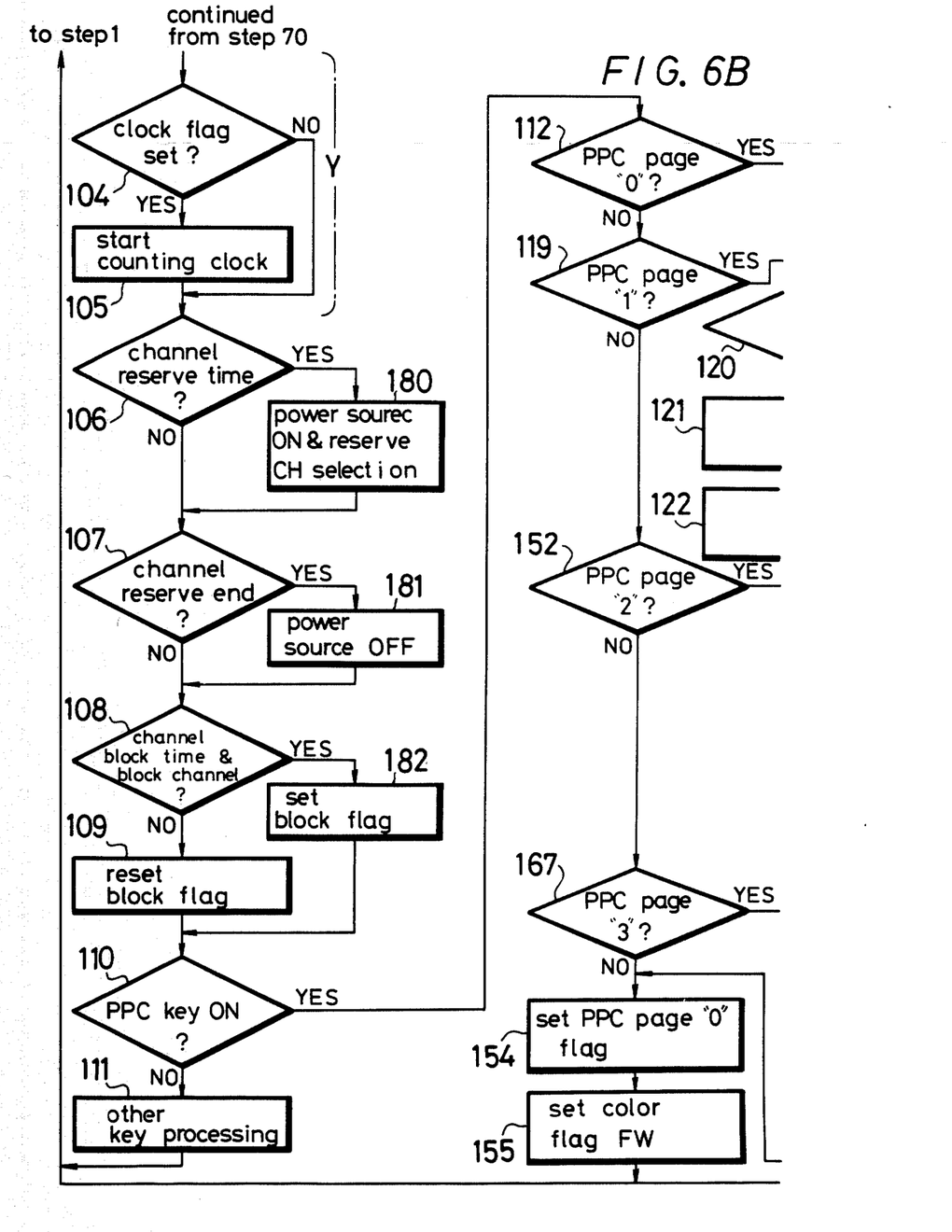
Figure 6C:
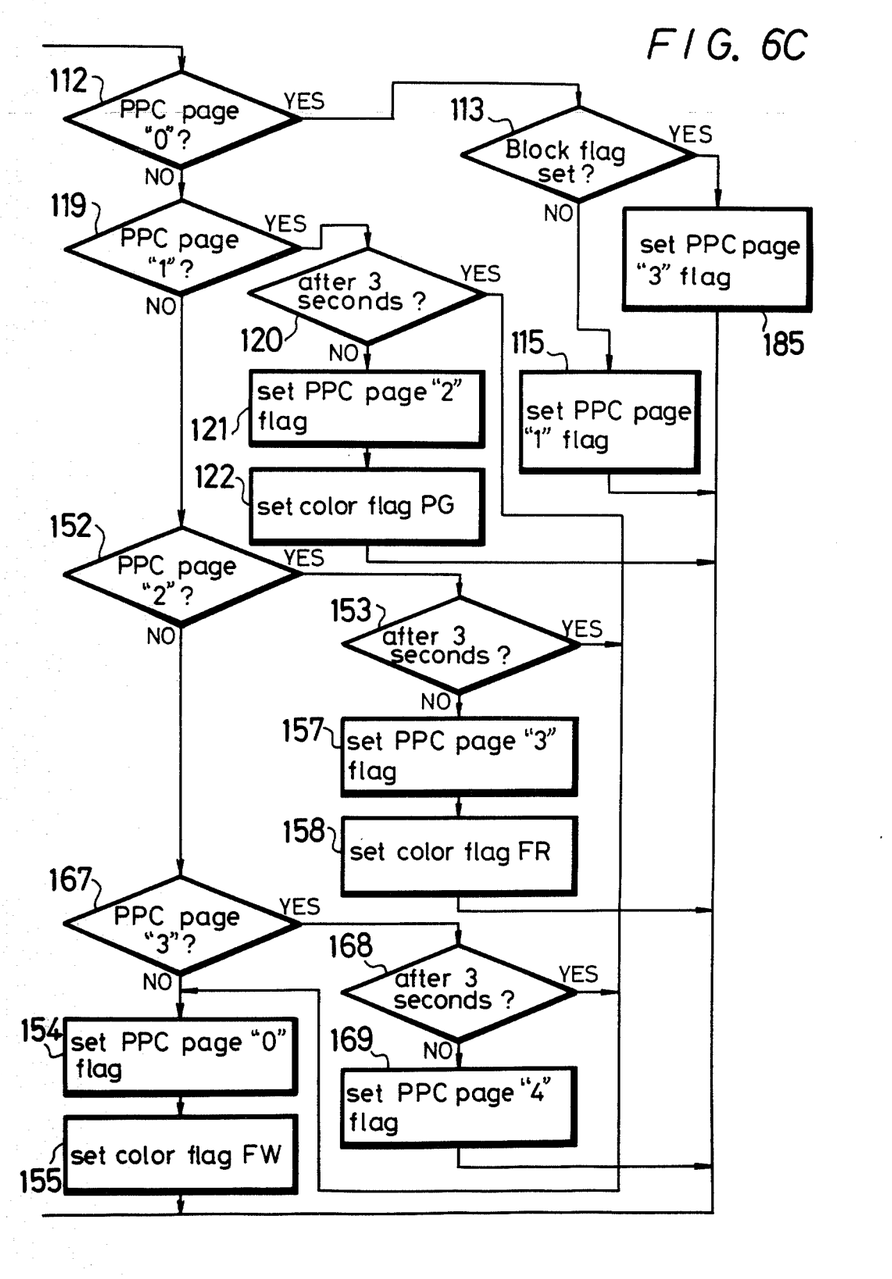

Step 110 is critical to the illustrated routine, since it is here that a check is made to see if PPC key 36 has been depressed. PPC key 36 controls the change from mode to mode, and from picture to picture, and so may be regarded as a mode changeover switch.

The routine is now in a state corresponding to step a of FIG. 3. Step 110 checks to see if PPC key 36 has been depressed. If it has not, and if step 111 determines that no other key has been depressed, the routine returns to step 101 and the normal television picture is displayed without interruption. Thus, if the operator simply turns on the television receiver and operates no other processing keys on commander 30, he will see only a standard television operating in the conventional manner. As discussed below, picture display device 10 operates in a number of different modes, and is changed from mode to mode by depression of PPC key 36. Each such mode has a characteristic event occurring therein and from which three second intervals are measured. When data is being input, the characteristic event is generally the last actuation of one of the processing keys for inputting data. However, if data is not being input, the characteristic event is the actuation of PPC key 36 to enter the respective mode. As discussed in detail below, the elapsed time between the time of occurrence of the characteristic event and the next actuation of PPC key 36 to enter or establish a different mode is used by control circuit 20 to determine which mode to enter. Specifically, if the elapsed time is greater than a predetermined time, three seconds in the illustrated embodiment, control circuit 20 always selects page "0" to display the normal television picture.

If in step 10 it is determined that PPC key 36 is depressed by the operator at a time when the timer has not yet been set, the routine moves to step 112 to see if the page is "0" and, since it is, moves to step 113 (FIG. 6C) to see if block flag FB is set. Since block flag FB has not been set, the page is set to "1" in step 115, and the routine loops back to step 101.

Now the page is "1", not "0", so the routine moves through step 116 to step 117 to see if the clock is set. Since the clock is not set as yet, the routine moves to step 118 to display the first auxiliary picture of FIG. 4A. It will be recalled that the first auxiliary picture of FIG. 4A and the current time display picture of FIG. 4B are collectively identified as page "1". If step 117 had determined that the clock was set, the routine would have moved instead to step 190, as will be discussed below.

Since only the page number has changed, the routine moves straight through to step 110. The operator again depresses PPC key 36 to set the clock. Picture display device 10 now enters a timer set mode. The routine passes through step 112 to step 119, which judges that the page is "1". The routine moves to step 120 (FIG. 6C), which is the first step in which control circuit 20 determines whether the elapsed time measured from the characteristic event in the respective mode to the current PPC actuation is greater or less than three seconds. In the timer set mode, the characteristic event is defined as the last PPC key actuation. What this means to the operator is that the three second period is measured from the time he depresses PPC key 36 to display the auxiliary picture of FIG. 4A to the time he next depresses PPC key 36. If he does not want to set the timer, he allows that elapsed time to be greater than three seconds. In that event, the routine moves to step 154 (bottom left-hand corner of FIG. 6C) to set the page to "0", to step 155 to set (initialize) the color flag FW, and then the routine loops back to step 101, so that the normal television picture is again displayed.

However, if the elapsed time is less than three seconds, the routine moves to step 121 to set the page to "2", and to step 122 to set a color flag FG. Color flag FG is used by control circuit 20 to cause CRT control circuit 25 to output signal $S_G$, which provides a green display of words and numbers on the picture screen. The routine loops again through steps 101 and 116 to step 123, which determines that the page is "2". Therefore the routine moves to step 124 to display the channel reserve picture identified as page "2". However, step 125 determines that the clock has still not been set. Therefore, the channel reserve picture includes the phrase "SET CLOCK" with an initialized demonstration clock consisting of an initial day of the week, hour and minute. In the example of FIG. 4C, this appears on the picture as "SET CLOCK SUN 12:00 A.M.". The input instruction cursor " ↓ " in the form of an arrow is displayed over the word "SUN" to indicate that data is to be entered for this element. In accordance with color flag FG, this input request display is in green. The routine loops to steps 101 and 110. To enter data PPC key 36 is not operated, but rather the processing keys 31–35 are operated, and the consequent processing is carried out in step 111.

Figure 7:
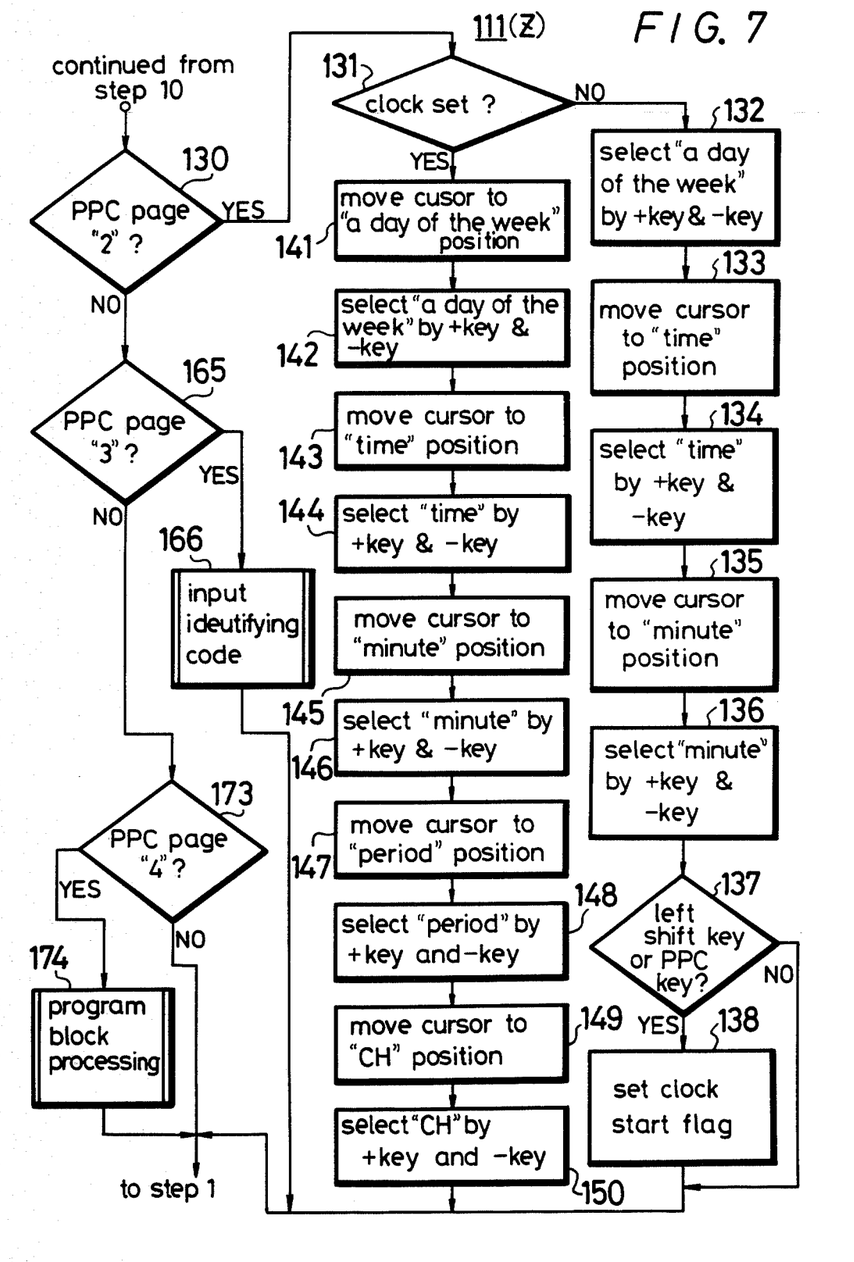
FIG. 7 is a detailed flow chart illustrating key processing of one step of the flowchart of FIGS. 6A–6C.

Step 111, which comprises a detailed key processing routine, is illustrated in FIG. 7 to being with step 130, to determine that the page is "2" and moves to step 131, to determine that the clock is not yet set. Therefore a clock (timer) set subroutine begins in step 132 to enable selection of a day of the week by appropriate actuations of "+" key 32 and "−" key 33. "+" key 32 is used to change the day of the week in the forward direction from SUN to MON to TUE, etc., while "−" key 33 is use to change the day of the week in the opposite direction from SUN to SAT, etc. Of course, if the current day of the week happens to be Sunday, there is no need to change the day at all. In any event, after the day of the week is selected in step 132, the cursor in step 133 is moved to the next element, i.e. the hour, by operating right shift key 35. Both the hour and minute of the current time may be set in steps 134–136 by operations of "+" key 32 and "−" key 33, to respectively increase or decrease the displayed number. To leave this routine, step 137 checks to see if either PPC key 36 or left shift key 34 has been depressed. If so, the clock flag FC is set in step 138. If right shift key 35 is depressed instead, clock flag FC is not set. In either case, the routine leaves step 111 and returns to step 101. Step 111, in its entirety, corresponds to the key processing of function Z illustrated in FIG. 5.

Since at this point the page is "2", the routine again moves through steps 101,116,123 and 124 to step 125. Assuming the clock has been set, in step 127 the display of "SET CLOCK" is erased and the cursor is shifted to point to channel reserve program #1. Picture display device 10 is now in the channel reserve mode. Step 104 now determines that clock flag FC is set and, therefore, the clock is started in step 105 and from then on keeps track of the current time. The routine then moves through step 110 into the key processing of step 111. As shown on FIG. 7, the page is still "2", but step 131 now determines that the clock is set, so that the routine moves to step 141 to start a channel reserve subroutine. As illustrated in FIG. 4C, up to three programs may be reserved, each defined by the day, the start time, the duration and the channel. Therefore, in step 141, with the cursor already moved to the day position, the day is selected in step a42 by actuations of "+" key 32 or "−" key 33.

In step 143 the cursor is moved to the start time position, and in step 144 the start time is entered by actuation of ten-key panel 31. In step 145 the cursor is moved to the minute position, and in step 146 the minute is entered. In step 147 the cursor is moved to the duration position, wherein the length of the program may be entered, and in step 148 the duration is entered. In step 149, the cursor is moved to the channel position, and in step 150 the channel is entered. The last key operation in step 150 or the PPC key 36 operation for entering the channel reserve mode, whichever occurs last, is the characteristic event in the channel reserve mode. In the presently described operation, keys have been operated in steps 150 to enter data. When only a review is desired, there will of course be no key operations. Again step 111 ends and the routine loops back to step 101 and to step 110.

When PPC key 36 is depressed in step 110, the routine moves through steps 112,119 and 152 to step 153 (FIG. 6C), where the elapsed time between the last key operation (or PPC operation) in step 150 and the current PPC operation is determined. If the elapsed time is greater than three seconds, the routine moves to step 154 to set the page to "0" and to step 155 to set color flag FW. Thus the program loops back to step 101 and the normal television picture is recovered.

On the other hand, if the elapsed time between the last key actuation in step 150 and the PPC key 36 operation in step 110 is less than three seconds, the routine moves from step 153 to step 157, where the page is set to "3", and to step 158, where a color flag FR is set. Color flag FR makes the displayed words appear in red, just as color flag FG made the displayed words in the timer set mode appear in green. Now the routine loops back through steps 101,116, 123, and 160 to step 161, wherein the auxiliary picture of FIG. 4D for the channel block identifying code is displayed.

The routine moves through steps 104 and 110 to step 111 to begin key processing for entering the channel block code. As shown in FIG. 7, since the page is "3", the routine moves from step 165 to step 166, which is a routine for inputting the identifying code by actuation of ten-key panel 31. The procedure is the same as for entering the channel reserve times. After this, the routine loops back through steps 101 to 110 and, if PPC key 36 is depressed, the routine moves through to step 167 which judges that the page is page "3". In a process similar to that occurring at step 153, the elapsed time between the last key operation in step 166 and the current PPC operation in step 110 is determined in step 168. This gives the operator another chance to recover the normal television picture. If more than three seconds have elapsed, once again the picture is changed to the normal television picture through steps 154 and 155 to step 101. If the elapsed time is less than three seconds, the routine proceeds to step 169, wherein the page is set to "4".

On the return loop from step 101 page "4" is detected in step 170 to enter the channel block mode, and in step 171 the channel block reserve picture, illustrated in FIG. 4E, is displayed. Now, when the routine moves through to step 111, page "4" is found in step 173, and the routine moves to program block processing step 174, wherein the days, times, durations, and channels are entered as during the channel reserve mode. The steps are essentially identical to those in the channel reserve routine beginning in step 141.

After the entry of data for the channel block mode is finished, the routine loops back to step 101, and since the page is "4", the routine passes through steps 112,119, 152, and 167 to steps 154 and 155, where the page is set to "0", the color flag FW is set, and thus once again the normal television is recovered.

The data entry procedure for program display device 10 is complete. The current time has been set, up to three programs have been reserved for future viewing, and up to three programs have been blocked to prevent their viewing. The resultant operation of the picture display device 10 in response to the information stored therein will now be described.

It is of course understood that even when the television receiver is turned off, the conventional program reserve timer is still keeping track of the current time and the reserved and blocked times. Therefore, when the current time coincides with one of the channel reserve times, this is detected in step 106 (FIG. 6B), and the routine moves to step 180, wherein the power to the television is turned on in response to a control signal from control circuit 20 through decoder 13 to AC power source circuit 17, the reserved channel is automatically selected by electronic tuner 12 in response to other control signals from control circuit 20, and the reserved program may be watched. This is in accordance with the well known operation of the reserve timers available in conventional VCRs. If in step 107 it is determined that the channel reserve time has ended, the power is turned off in step 181. If not, the routine checks in step 108 whether the current time and the reserved channel correspond to a channel block time and channel. If not, block flag FB is reset and television viewing proceeds unimpaired. However, if the current time and channel are a channel block time and channel, block flag FB is set in step 182 and consequently when the routine moves back through step 101 to step 102 to find the block flag is set, the routine moves to step 183 for the display of the third auxiliary picture, illustrated in FIG. 4F.

To remove the channel block, PPC key 36 is depressed. This is detected in step 110, and the routine moves through steps 112 and 113 to step 185, wherein page "3" is set and the second auxiliary picture (FIG. 4D) appears. If the correct identifying code is entered, the channel block reserve picture (FIG. 4E) appears. To release the channel block, the "day of the week" is erased by stepping through the days by actuation of "+" key 32 or "−" key 33 until a blank coming between "SAT" and "SUN" appears. Now step 108 judges that the current time is not a block time, so in step 109 the block flag is reset and the normal television picture of the reserved channel is displayed.

Suppose now that, when the power source of the television receiver is turned on, the clock is already set. Initially, the normal television picture is displayed. If PPC key 36 is depressed, the routine moves through steps 110,112, and 113 to step 115, wherein page "1" is set. This is judged in step 116, at step 117 the clock is judged to be set, so the routine moves to step 190 (FIG. 6A). In step 190, the elapsed time from the time when the page was set to "1" is judged. For up to three seconds, the routine loops through step 191, to display the day of the week and current time as in FIG. 4B. After three seconds the routine loops through step 192 to display the current time only. Suppose now that during this current time picture, PPC key 36 is depressed. Since the page is "1", the routine moves through to steps 110,112, and 119 to step 120. Step 120 judges the same three second interval as was judged in step 190, i.e. from the first PPC operation to display the day and current time up to the present time, which now is identified with the second PPC key operation. If more than three seconds have elapsed, the routine moves back to step 154 to set the page to "0", reset color flag FW, and to recover the normal television picture. If less than three seconds have elapsed, step 121 sets the page to "2", step 122 sets color flag FG, and the processing enters the channel reserve mode without having gone through the timer set mode. This corresponds to the transfer from step c to step f in FIG. 3.

Thus, in accordance with the present invention, picture display device 10 adds the following features to the conventional operation of the standard television receiver:

(1) The main types of pictures are sequentially displayed in response to repeated operations of PPC key 36. Page "0" appears whenever the television receiver is turned on and is the normal television picture. Page "1" is the current time display superimposed on the normal television picture, and is available at any time by a single depression of PPC key 36. Pages "2", "3" and "4" may be sequentially displayed by successive depressions of PPC key 36 each within a predetermined time, that is, within three seconds, of the next previous depression. On the other hand, if more than three seconds elapses between one PPC key operation and the next, the normal television picture display is always recovered. Consequently, to recover the normal television picture display, the operator need only wait three seconds from the last operation of key 36 and then depress PPC key 36 again. Thus the normal television picture display can be easily and quickly recovered.

(2) Since the normal television picture is the fundamental picture, the additional features available in picture display device 10 will not interfere with the conventional operation of the television receiver. In fact, unless the operator specifically wishes to take advantage of one of these features, he may completely ignore them.

(3) Any number of different main pictures can be made available, with any appropriate auxiliary pictures used for explanation or to assist the input of data, merely by increasing the memory capacity of the microcomputer in control circuit 20 and implementing appropriate software. Thus, picture display device 10 is not limited to the herein described specific example of operation, and such operation but may be expanded as desired.

(4) The second type of picture is the current time display of the day and time. When these are set in the initializing operation, the time count operation (step 105) is started at the point at which the mode changes to the channel reserve mode, so PPC key 36 can be used as a time count start key. That is, a preset time may be entered into the clock to correspond with a present time just coming up within the next minute. At the time when these two times are coincident, PPC key 36 may be depressed to start the clock in synchronism with the correct time.

After the predetermined time (three seconds) elapses following the start of the time count operation, the day of the week display is automatically erased so that it will not interfere with the television picture.

The current time display can be conveniently erased whenever the operator wishes to do so just by depressing PPC key 36 after three seconds. The current time display can be advantageous in the morning when the operator is getting ready to go to work and wishes to keep close track of the time. At such time the time display may be desirable. On the other hand, in the evening, the operator may wish to relax and not keep close track of the minutes, so that the time display would be undesirable. Alternatively, if the operator is watching the television at a time when the broadcast station is itself broadcasting the current time, there is no need for an additional display thereof.

(5) If neither the clock nor the channel reserve is set, the cursor "↓" stays at the position of "SUN" in the timer set display, so that the channel reserve information cannot be entered until the clock is set. Therefore, the operator cannot set the channel reserve believing that it will be operative, when in fact the clock is not set, and so is not counting the time. In addition, all the data being input for setting the clock, the channel reserve, and the channel block reserve are displayed on the picture screen as they are entered, so that such data can be confirmed by the operator. This makes it much easier to prevent misoperation of picture display device 10 by the entry of incorrect data. Furthermore, since all three programs of the channel reserve are displayed at once on the picture screen, the entire programmed state can be confirmed in advance.

(6) Since the picture display device 10 has a channel block reserve mode and an escape operation from the channel block, it is possible to block the viewing of programs undesirable for children. In this case, unless the proper identifying code is input, neither the channel block reserve nor the escape operation can be completed, so that it is possible to avoid having the children tamper with the channel block.

Furthermore, for PPC page "2", the display is in green, while for PPC pages "3" and "4" the display is red. Thus the different types of data to be input, that is time versus channel selection, are indicated to discourage the erroneous inputs.

Having specifically described a preferred embodiment of the invention, it will be apparent that the invention is not limited to such embodiment, and that many modifications and variations may be effected therein by one skilled in the art without departing from the spirit or scope of the present invention as defined in the appended claims.

We claim:

1. A picture display apparatus for displaying at least first, second and third types of pictures in that order in a repeating cyclical sequence, said picture display apparatus comprising;
    display means having first, second and third modes of operation for displaying said first, second and third types of pictures, respectively;
    actuable switch means;
    control means operably connected to said display means and responsive to actuation of said switch means for establishing one of said modes of operation and thereby selecting the respective one of said types of pictures for display, each of said modes having a characteristic event occurring therein;
    timing means for determining an elapsed time from said characteristic event occurring in the respective mode to a next actuation of said switch means;
    said control means being responsive to an actuation of said switch means in each of said modes to select the next of said modes in said sequence when said elapsed time is less than a predetermined time, and to select said first mode for displaying said first type of picture when the elapsed time is at least as great as said predetermined time.

2. A picture display apparatus according to claim 1; wherein said first type of picture is a standard television picture;
    said second type of picture is a display of a day of the week and a current time;
    said control means includes programmable timer means for storing programming information corresponding to said television picture; and
    said third type of picture is a display of said programming information.

3. A picture display apparatus according to claim 2; wherein said second type of picture includes a first subpicture displaying said day of the week and said current time, and a second subpicture displaying said current time; and wherein said first subpicture is displayed for said predetermined time following the selection of said second mode, and said second subpicture is displayed following said predetermined time after said selection of the second mode.

4. A picture display apparatus according to claim 1; wherein said display means includes a standard television receiver having channel selection means for selecting one of a plurality of television channels to provide said first type of picture;
    said control means further includes programmable timer means including memory means for storing channel reserve information adapted to be read out of said memory means for controlling said channel selection means to select reserved channels at reserved times;
    said second type of picture is a display of a day of the week and a current time; and
    said third type of picture is a display of said channel reserve information.

5. A picture display apparatus according to claim 4; wherein said programmable timer means further includes clock means for generating day of the week information and current time information, and wherein said second type of picture is a display of said day of the week information and said current time information.

6. A picture display apparatus according to claim 5; wherein said programmable timer means further controls said channel selecting means to prevent selection of blocked channels at blocked times in accordance with channel block information stored in said memory means and corresponding to said blocked channels and times; and
    said picture display device selectively displays said channel block information as a fourth type of picture in a fourth of said modes.

7. A picture display apparatus according to claim 6; further comprising a plurality of actuable key means for generating said channel block information and said channel reserve information; and wherein said control means is responsive to actuation of said key means to store said generated channel reserve and channel block information in said memory means.

8. A picture display apparatus according to claim 7; wherein actuation of said key means further generates initial day of the week and initial time information, and said clock means generates said day of the week information and said current time information in accordance with said initial day of the week information and initial time information generated by actuation of said key means.

9. A picture display apparatus according to claim 7; wherein said characteristic event of the second mode is the actuation of said switch means to select said second mode for said display of the second type of picture.

10. A picture display apparatus according to claim 9; wherein said control means stores said channel reserve information only in said third mode; and wherein the characteristic event in said third mode is the later of the actuation of said switch means to select said third mode and the most recent actuation of one of said key means in said third mode.

11. A picture display apparatus according to claim 10; wherein said control means stores said channel block information only in said fourth mode; and wherein the characteristic event in said fourth mode is the later of the actuation of said switch means to select said fourth mode and the most recent actuation of one of said key means in said fourth mode.

12. A picture display apparatus according to claim 11; wherein said fourth type of picture includes a first sub-picture initially displayed upon entering the fourth mode for assisting the input of an identifying code to said memory means by actuation of said key means, and said control means stores said channel block information in said memory means in response to said identifying code.

* * * * *